United States Patent
Wang

(10) Patent No.: US 10,144,158 B1
(45) Date of Patent: Dec. 4, 2018

(54) CRAYON RECYCLING CARTRIDGE

(71) Applicant: Ruicheng Wang Wang, Apex, NC (US)

(72) Inventor: Ruicheng Wang Wang, Apex, NC (US)

( * ) Notice: Subject to any disclaimer, the term of this patent is extended or adjusted under 35 U.S.C. 154(b) by 0 days.

(21) Appl. No.: 15/656,445

(22) Filed: Jul. 21, 2017

(51) Int. Cl.
| | |
|---|---|
| *A45C 11/34* | (2006.01) |
| *B29C 39/00* | (2006.01) |
| *B29C 39/02* | (2006.01) |
| *B29C 39/24* | (2006.01) |
| *B29C 39/26* | (2006.01) |
| *B29C 39/28* | (2006.01) |
| *B29C 39/38* | (2006.01) |
| *B65D 77/20* | (2006.01) |
| *B65D 85/20* | (2006.01) |
| *B29L 31/00* | (2006.01) |

(52) U.S. Cl.
CPC .............. B29C 39/24 (2013.01); A45C 11/34 (2013.01); B29C 39/003 (2013.01); B29C 39/02 (2013.01); B29C 39/26 (2013.01); B29C 39/28 (2013.01); B29C 39/38 (2013.01); B65D 77/20 (2013.01); B65D 85/20 (2013.01); B29K 2883/00 (2013.01); B29L 2031/725 (2013.01)

(58) Field of Classification Search
CPC ....... B29C 39/24; B29C 39/003; B29C 39/02; B29C 39/26; B29C 39/28; B29C 39/38; A45C 11/34; B29K 2883/00; B29L 2031/725; B65D 77/20; B65D 85/20
See application file for complete search history.

(56) References Cited

U.S. PATENT DOCUMENTS

| | | | | |
|---|---|---|---|---|
| 2,503,947 A * | 4/1950 | Haskew | ................... | H01F 1/24 |
| | | | | 106/38.3 |
| 3,412,572 A * | 11/1968 | Kesling | ................... | F25C 1/243 |
| | | | | 249/120 |
| 3,829,056 A * | 8/1974 | Baker | ..................... | F25C 1/243 |
| | | | | 220/315 |
| 3,930,376 A * | 1/1976 | Schwartz | ............... | F25C 1/243 |
| | | | | 249/127 |
| 4,136,773 A * | 1/1979 | Booth | .................... | A45C 11/34 |
| | | | | 206/214 |
| 4,894,004 A * | 1/1990 | Brault | .................... | B29C 41/18 |
| | | | | 249/105 |
| 5,196,127 A * | 3/1993 | Solell | ..................... | F25C 1/243 |
| | | | | 221/91 |
| 9,033,693 B2 * | 5/2015 | Palazzolo | ........... | A21C 11/106 |
| | | | | 425/118 |
| 2009/0050784 A1 * | 2/2009 | Slappay | ................... | F25C 1/24 |
| | | | | 249/203 |

* cited by examiner

*Primary Examiner* — Kevin R Kruer
(74) *Attorney, Agent, or Firm* — Oliff PLC

(57) ABSTRACT

The following invention is used to recycle broken pieces of crayons, A crayon package comprises a portion of the box which can be placed in an oven, said portion of the box being detachable from the package, said portion of the box is designed as a crayon recycling cartridge, the crayon recycling cartridge comprises slots, the edges of the slots are provided with guide slopes, the bottom of the guide slope is connected to the edge of the slot and the slot is expanded outward, which increases the volume of the slot. The used crayons will be placed into the slots, melted and re-casted into new crayons. And if too much used crayons are placed above the edge of the slots, when the crayon melts, the guide slope will catch the melted crayons, sending it back down into the slots, fitting to the volume of the slots.

5 Claims, 3 Drawing Sheets

CRAYON RECYCLING CARTRIDGE

TECHNICAL FIELD

The present invention relates to crayons, and more particularly to crayon packaging.

BACKGROUND

When Children are using crayons, often it will get accidentally broken. Broken crayons, because of the shorter length, is not as easy to hold up, so often will be discarded. But in fact, this part of the crayon can be recycled. The present invention is a cartridge for recycling crayons which is included in the crayon packaging. By recycling crayons, it could educate children's environmental awareness.

SUMMARY

The present invention provides a crayon recycling cartridge for easy recycling of used crayons, the following is the method:
1. The package comprises a part which can be placed into an oven, the part is a crayon recycling cartridge, the crayon recycling cartridge includes slots, the edges of the slots are provided with guide slopes, the bottom of the guide slope is connected to the edge of the slot and the slot is expanded outward, which increases the volume of the slot. The used crayons will be placed into the slots, melted and re-casted into new crayons. And if there are too much used crayons placed above the edge of the slots, when the crayon melts, the guide slope will catch the melted crayons, sending it back down into the slots, fitting it to the volume of the slots.

Through the mentioned design above, when the crayon is shortened, the crayons with similar colors can be put into the same slot, melted and re-casted into new crayons. The edge of the slot is provided with a guide slope, which enlarges the space where the crayons are placed, directing the user to place more crayons, because once the crayons are melted, the liquid state will take up less space than the solid state due to the gaps of air between the crayons before they're melted, the designed guide slope directs the user to place in more crayons into the slots, once the crayons are melted, the designed slopes will send it back down into the slots. And if the melted liquid level goes above the edge of the slot, the non-continuous bumps on the edges of the guide slope will pierce into the protruding sides of the new crayon. Once they're cooled and solidified, it will be easier to clean up those unwanted edges of the new crayon To achieve further technical effects, the present invention may also employ the following further technical methods:
The part of the box which can be put into the oven is a silicone cartridge.
The slot is molded with in the silicone cartridge.
There are four to six slots.
The connected part between the slot body and the guide slope has some designed bumps used to help remove the unwanted edges of the crayon after the crayon is recast.

Through the above technical proposal, when using the invention, it is convenient to separate the silicone cartridge from the packing box. As many cooking molds are made of silicon, it brings children the same fun as cooking. And the softness of the silicone makes it convenient to peel off the re-casted crayons from the recycling cartridge. The designed bumps on the edges of the slots makes it easier for the kids to clean up the unwanted edge off the newly re-casted crayons.

DETAILED DESCRIPTION OF THE PREFERRED EMBODIMENTS

Figure 1:
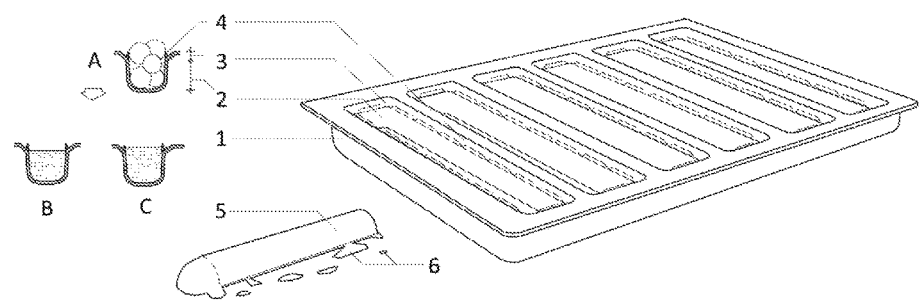
FIG. 1 is the state of use of this invention.

See FIG. 1.

The present invention provides a crayon package for the recycling of crayons. The package comprises a part which can be placed in an oven, the part is a crayon recycling cartridge 1, the crayon recycling cartridge 1 includes a slot 2, the edge of the slot 2 is provided with a guide slope 3, the bottom of the guide slope 3 is connected to the edge of the slot 2 and the slot 2 is expanded outward, which increases the volume of the slot 2. The used crayons will be placed into the slots 2, melted and re-casted into new crayons 5. And if there are too much used crayons placed above the edge of the slots 2, when the crayon melts, the guide slope 3 will catch the melted crayons, sending it back down into the slots 2, fitting it to the volume of the slots 2.

when the crayon is shortened, the crayons with similar colors can be put into the same slot 2, melted and re-casted into new crayons 5, since the liquid state of the crayons takes up less space than the solid states of the crayons, the edge of the slot is provided with a guide slope 3, which enlarges the space where the crayons can be placed, directing the user to place more crayon. The left side of FIG. 1 is a reference diagram of the crayon melting process, because of the amounts of crayons placed in the slot 2 could be different, the final re-casted crayon could look like form B or form C. As can be seen from the figure, in state A, after the used crayons are placed in the slot 2, the melted liquid surface level could be lower than the bottom edge of the guide slope 3, and after cooling it creates a re-casted crayon as form B. Or when the more crayons are placed more densely together, the melted liquid surface level could be above the bottom edge of the guide slope 3, and after cooling it creates a re-casted crayon as form C. If that does happen, then the non-continuous bumps 4 on the edges of the guide slope 3 will pierce into the protruding sides of the new crayon 5, making it easier to clean up those unwanted edges 6 of the new crayon 5

The part of the box which can be put into the oven is a silicone cartridge 1

The slot 2 for the crayons is molded within the silicon cartridge 1

There are four to six slots 2, and in the case of smaller packages of crayons, the number of slots 2 may be three to four, or even one or two, depending on the number of crayons.

The connecting part between the slot 2 and the guide slope 3 have designed dis-continues bumps 4, making it easier to clean up unwanted edges 6 of the crayons after it's been melted and re-casted.

When the invention is used, it is convenient to separate the silicone cartridge 1 from the package and put it into the oven. Since many cooking molds are made of silicone, the children are brought about the same fun as cooking, and the silicone is soft, so it is convenient for the children to take out the new solidified crayons. The discontinues bumps 4 between the connecting parts of the slot 2 and the guide slope 3 makes it convenient to get rid of unwanted edge 6 of the newly formed crayon, making cleaning up easier.

Embodiment 1

Figure 2:
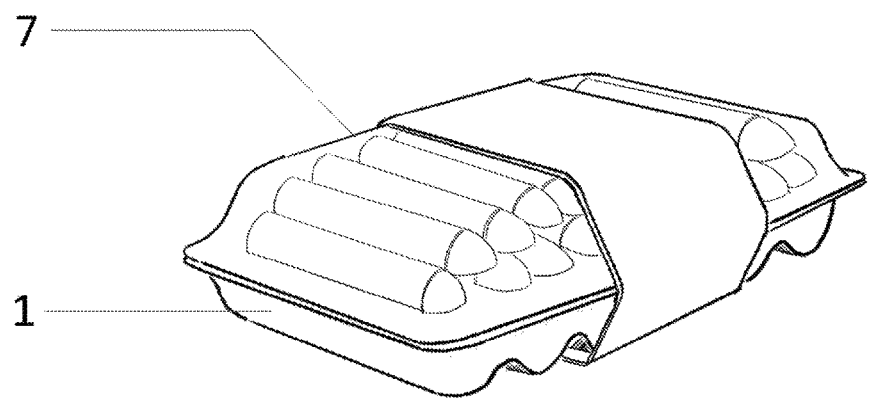
FIG. 2 is a schematic drawing of an example of the present invention.

See FIG. 2. Package 7 is shown in the figure, and the crayons are lying flat on the package 7, with the crayon recycling cartridge 1 being provided at the bottom of the package and can be tiled to accommodate a corresponding number of crayons. When it's needed to recycle the used crayons, take out the cartridge 1 under the packaging. When the crayons are shortened to a point where it can't be use anymore or if the crayon is broken to pieces, put the used crayons with similar colors on the bottom of the cartridge 1, and the used crayons with the cartridge 1 are placed together in the oven, melted and re-casted into new crayons 5.

Embodiment 2

Figure 3:
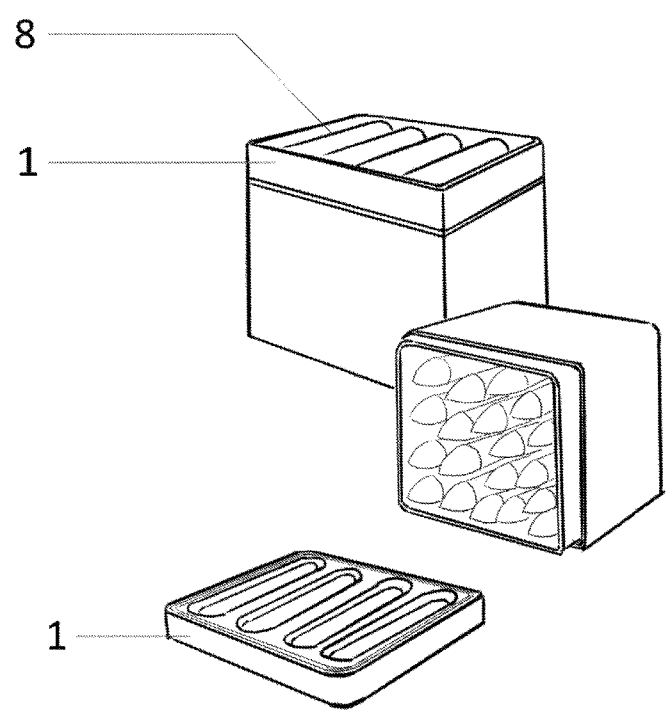
FIG. 3 is a schematic drawing of a second example of the present invention.

See FIG. 3. Package 8 is shown in the figure, and the crayons are placed vertically in the package 8, with the crayon recycling cartridge 1 being provided at the top of the package. When the crayons are shortened to a point where it can't be use anymore or if the crayon is broken to pieces, the used crayons with similar color can be placed into the cartridge 1, and the used crayons with the cartridge 1 are placed together in the oven, melted and re-casted into new crayons 5.

Embodiment 3

Figure 4:
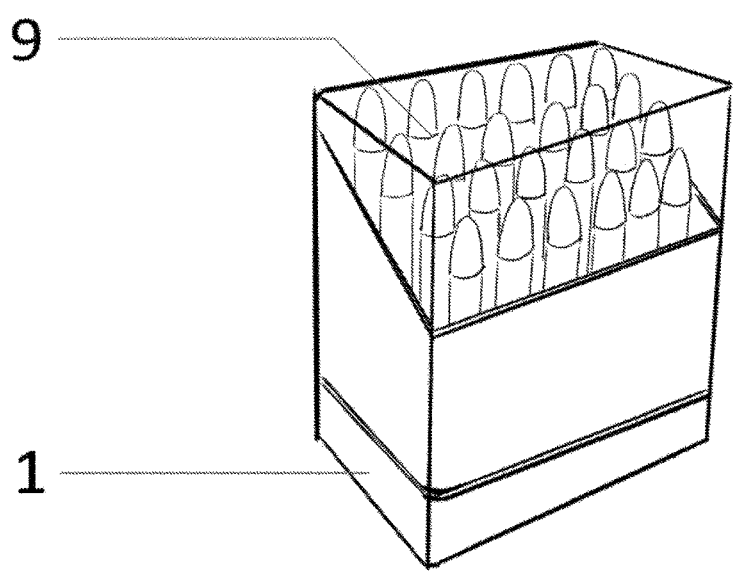
FIG. 4 is a schematic drawing of a third example of the present invention.

See FIG. 4. Package 9 is shown in the figure, and the crayons are placed vertically in the package 9, with the crayon recycling cartridge 1 being provided at the bottom of the package. When the crayons are shortened to a point where it can't be use anymore or if the crayon is broken to pieces, the used crayons with similar color can be placed into the cartridge 1, and the used crayons with the cartridge 1 are placed together in the oven, melted and re-casted into new crayons 5.

The invention claimed is:

1. A crayon package comprising:
   A package;
   A plurality of crayons in said package; and
   A crayon recycling cartridge detachably attached to the crayon package, the crayon recycling cartridge being made of a material having a melting point higher than that of the crayons and capable of being placed in an over to melt and recast crayons;
   wherein the crayon recycling cartridge comprises at least one slot having a bottom, walls extending upward from the bottom of the at least one slot, an edge at the top end of the walls; and a guide slope having a bottom connected to said edge wherein said guide slope slopes outwardly relative to the walls of the at least one slot and is capable of guiding melted crayons to flow into the at least one slot.

2. The crayon package according to claim 1, wherein the crayon recycling cartridge is made of silicon.

3. The crayon package according to claim 2, wherein the at least one slot is integrally formed with the crayon recycling cartridge.

4. The crayon package according to claim 1 wherein the crayon recycling cartridge comprises four to six slots.

5. The crayon recycling package according to claim 1 wherein the crayon recycling cartridge further comprises discontinuous bumps located where said walls and said guide slope are connected.

* * * * *

UNITED STATES PATENT AND TRADEMARK OFFICE
CERTIFICATE OF CORRECTION

Page 1 of 1

PATENT NO. : 10,144,158 B1
APPLICATION NO. : 15/656445
DATED : December 4, 2018
INVENTOR(S) : Ruicheng Wang It is certified that error appears in the above-identified patent and that said Letters Patent is hereby corrected as shown below:

On the Title Page

(71) Applicant Should Read: Ruicheng WANG

(73) Inventor Should Read: Ruicheng WANG

Signed and Sealed this
Eleventh Day of May, 2021

Drew Hirshfeld
*Performing the Functions and Duties of the
Under Secretary of Commerce for Intellectual Property and
Director of the United States Patent and Trademark Office*